3,061,573
PROCESS FOR PREPARING SOLUTIONS OF POLYETHYLENE TEREPHTHALATE WITH TRICHLOROMETHANE
Henricus Bernardus Joseph Horsten, Arnhem, Netherlands, assignor, by mesne assignments, to N.V. Onderzoekingsinstituut Research, Arnhem, Netherlands, a corporation of the Netherlands
No Drawing. Filed Apr. 10, 1958, Ser. No. 727,528
Claims priority, application Netherlands May 2, 1957
2 Claims. (Cl. 260—33.8)

This invention relates to the preparation of solutions of amorphous homopolyesters and to the preparation of polyester powder from said solutions, as well as to artificially formed products manufactured from said solutions and said powder and to coatings applied by the use of said solutions or said powder.

The polyester with which the present invention is concerned is the synthetic linear highly polymeric polyester derived from glycols of the series $HO(CH_2)_nOH$, wherein $n$ is a whole number of from 2 to 10 and terephthalic acid or an ester forming derivative thereof as described in U.S. Patent No. 2,465,319. Of these polymeric polymethylene terephthalates, polyethylene terephthalate is preferred because of its commercial availability.

There are certain advantages in the use of solutions of the aforesaid polyesters. Because of this, numerous attempts have been made to dissolve the polyesters in a suitable solvent. It is known that amorphous polymeric polymethylene terephthalates ordinarily are only sparingly soluble in halogen-containing hydrocarbons, such as tetrachloroethane. To obtain more concentrated solutions of the polymeric polymethylene terephthalates, it has heretofore been suggested to use a solvent mixture containing, for example, a halogen-containing hydrocarbon and phenol or cresol.

Solvent mixtures for the polyesters are not practical because of their various disadvantages. For example, removal of the less volatile component from the products manufactured from the polyester solutions is difficult and may result in the formation of inferior products. Further, when the polyesters dissolved in a solvent mixture are dry spun, the mixture of the solvents recovered has a composition different from that of the mixture in which the polymer was dissolved. Therefore, the mixture cannot readily and conveniently be recovered for reuse.

It is an object of this invention to provide a process for the preparation of concentrated solutions of polymeric polymethylene terephthalates in a single solvent which does not decompose the polymer and in which process the above described disadvantages of using a solvent mixture are avoided.

It is another object of this invention to provide a concentrated solution of polymeric polymethylene terephthalates in a single solvent which does not decompose the polymer, the solution being suitable for the formation of commercially useful products.

It is still another object of this invention to provide articles from a concentrated solution of polymeric polymethylene terephthalate in a single solvent which does not decompose the polymer.

These and other objects of the invention may be accomplished in general by dissolving a synthetic linear highly polymeric polyester of a dicarboxylic acid and a glycol in which the terminal hydroxy groups are separated by from two to ten methylene groups, inclusive, at a temperature of at most 0° C., preferably at a temperature between —5° C. and —30° C., in a solvent consisting essentially of a halogenated hydrocarbon having at most two carbon atoms and from two to four halogen atoms in the molecule. The use of the solvent makes practical the preparation of solutions containing more than 15% by weight of the polyester.

Representative compounds coming within the scope of the above definition and suitable for use as solvents are dichloromethane, trichloromethane, dichloroethane, trichloroethane, tetrachloroethane, dichloroethylene, trichloroethylene and tribromomethane.

According to a preferred embodiment of this invention, polyethylene terephthalate is contacted with trichloromethane at a temperature between —10° C. and —20° C. to obtain a solution of about 20% by weight of the polyethylene terephthalate.

The polyester solutions of the instant invention may be utilized in various ways. For example, the solutions may be particularly useful for the formation of shaped objects, such as threads, fibers, films and foils, by the so-called wet spinning technique wherein the polyester solution is extruded through a suitably shaped orifice into a bath comprising a non-solvent for the polyester, or by the so-called dry spinning technique wherein the polyester solution is extruded through a suitably shaped orifice into an atmosphere where the solvent is removed from the shaped object to coagulate same.

Another important utilization of a solution of a polyester is in employment thereof as a coating composition for a base material, such as fabrics, films, paper, and the like.

The invention also finds specific usefulness in that upon elevating the temperature of the polyester solutions to above 15° C., or preferably between 30° and 50° C., the polyester precipitates. The thus formed precipitate may be conveniently separated from the solvent, dried and comminuted to powder. The polyester powder may be used for coating objects by the flame spraying technique, and also may be used for injection molding or extrusion of objects, and for the melt spinning of threads or fibers, or the melt casting of films and foils.

It is characteristic of the invention that the solutions provided by it are stable, i.e., the solvents do not cause any degradation of the polyester, either at the low temperature during dissolution or at the higher temperature during the formation of the precipitate. Also, the precipitate may be dried without any degradation of the polyester.

The following examples illustrate preferred methods of preparing solutions in accordance with the principles of this invention and of employing these solutions in the production of useful articles. It is to be understood that this invention is not to be limited by the details set forth in the examples.

*Example I*

To 800 g. of trichloromethane there were added 200 g. of amorphous polyethylene terephthalate, that had a specific viscosity of 0.57 (determined with a 1% by weight solution in metacresol at 25° C.). The mixture was stirred for 100 minutes at —15° C. to effect dissolution of the polyethylene terephthalate.

The resulting solution was then heated to 40° C. At this temperature a jelly-like precipitate was formed. This precipitate was filtered, and the filter cake was dried at 100° C. Finally, the dried filter cake was ground into powder.

The specific viscosity of the thus precipitated and dry polyester was measured to be 0.57. Hence, the process did not degrade the polymer.

*Example II*

To 250 g. of trichloromethane there were added 25 g. of amorphous polyethylene terephthalate in the form of undrawn spun thread, that had a specific viscosity of 0.65 (determined as in Example I). The mixture was stirred for 20 minutes at −10° C. to effect dissolution of the polymer.

The resulting solution was then heated to 40° C., thereby precipitating the polymer. The precipitate was filtered and the filter cake was dried under reduced pressure at 50° C. Finally, the dried filter cake was ground into powder.

The specific viscosity of the powder was 0.65. Hence, no degradation of the polyethylene terephthalate occurred during the process.

*Example III*

To 150 g. of tribromomethane there were added 5 g. of amorphous polyethylene terephthalate fibers, that had a specific viscosity of 0.60 (determined as in Example I). The mixture was stirred for 30 minutes at −15° C. to effect dissolution of the polymer.

The resulting solution was then heated to 45° C., thereby precipitating the polymer. The precipitate was filtered and the filter cake was dried at 100° C. Finally, the dried filter cake was ground into powder.

The specific viscosity of the powder was 0.60. Hence, no degradation of the polyethylene terephthalate occurred during the process.

*Example IV*

To 100 g. of dichloromethane there were added 5 g. of amorphous polyethylene terephthalate, that had a specific viscosity of 0.60 (determined as in Example I). The mixture was stirred for 60 minutes at −15° C. to effect dissolution of the polymer.

The resulting solution was then heated to 35° C., thereby precipitating the polymer. The precipitate was filtered and the filter cake was dried at 100° C. Finally, the dried filter cake was ground into powder.

The specific viscosity of the powder was 0.60. Hence, no degradation of the polyethylene terephthalate occurred during the process.

Since it is obvious that many changes and modifications can be made in the above described invention without departing from the nature and spirit thereof, it is to be understood that the invention is not to be limited to the details described herein except as set forth in the appended claims.

What is claimed is:

1. A process for the preparation of a solution of a polyester containing at least 5% by weight of polyethylene terephthalate comprising contacting polyethylene terephthalate at a temperature of at most 0° C. with trichloromethane as the sole solvent.

2. A process as defined in claim 1 wherein the temperature is between −5° and −30° C.

References Cited in the file of this patent

UNITED STATES PATENTS

| | | |
|---|---|---|
| 2,497,376 | Swallow et al. | Feb. 14, 1950 |
| 2,720,506 | Caldwell | Oct. 11, 1955 |
| 2,720,507 | Caldwell | Oct. 11, 1955 |
| 2,743,250 | Sweet et al. | Apr. 24, 1956 |
| 2,752,320 | De Witt | June 26, 1956 |
| 2,861,969 | De Witt | Nov. 25, 1958 |
| 2,882,255 | Caldwell | Apr. 14, 1959 |